United States Patent
Dionne

(10) Patent No.: US 12,378,988 B2
(45) Date of Patent: Aug. 5, 2025

(54) TAPERED FASTENER

(71) Applicant: DuraForce Holdings, LLC, Roanoke, VA (US)

(72) Inventor: Pierre A. Dionne, Roanoke, VA (US)

(73) Assignee: DuraForce Holdings, LLC, Roanoke, VA (US)

( * ) Notice: Subject to any disclaimer, the term of this patent is extended or adjusted under 35 U.S.C. 154(b) by 615 days.

(21) Appl. No.: 17/383,682

(22) Filed: Jul. 23, 2021

(65) Prior Publication Data

US 2021/0348642 A1    Nov. 11, 2021

Related U.S. Application Data

(63) Continuation of application No. PCT/US2020/015627, filed on Jan. 29, 2020.
(Continued)

(51) Int. Cl.
*F16B 39/284*    (2006.01)
*B60B 27/00*    (2006.01)

(52) U.S. Cl.
CPC ............ *F16B 39/284* (2013.01); *B60B 27/00* (2013.01); *B60B 2900/131* (2013.01); *B60B 2900/521* (2013.01)

(58) Field of Classification Search
CPC .............. B60B 27/00; B60B 2900/131; B60B 2900/521; B60B 3/16; F16B 2/005;
(Continued)

(56) References Cited

U.S. PATENT DOCUMENTS

| 1,140,594 A | 5/1915 | Howe |
| 1,271,449 A | 7/1918 | Drake |

(Continued)

FOREIGN PATENT DOCUMENTS

| CN | 204458753 U | * 7/2010 | ............ F16B 37/00 |
| CN | 109882490 A | 6/2019 | |

(Continued)

OTHER PUBLICATIONS

EPO, Office Action for corresponding European Patent Application No. 20747584.9, dated Apr. 17, 2024, 5 pages.
(Continued)

*Primary Examiner* — S. Joseph Morano
*Assistant Examiner* — Eva L Comino
(74) *Attorney, Agent, or Firm* — NK Patent Law

(57) ABSTRACT

A vibration resistant nut is provided for attaching a working surface to a threaded stud, the stud extending through a hole defined through the working surface. The nut includes an annulus for receiving the stud. The annulus includes a cylindrical portion and a tapered terminal end portion for being received in the hole. The tapered terminal end portion extends from the cylindrical portion. The tapered terminal end portion has an outer surface that narrows diametrically from the cylindrical portion. The nut includes a head extending from the cylindrical portion of the annulus opposite the tapered terminal end portion, the head having outer engagement surfaces for engaging a tool for rotation of the nut, the head having a threaded interior for engaging threads of the stud.

15 Claims, 9 Drawing Sheets

Related U.S. Application Data

(60) Provisional application No. 62/798,435, filed on Jan. 29, 2019.

(58) Field of Classification Search
CPC ...... F16B 5/0241; F16B 39/284; F16B 37/00; F16B 39/36
USPC ...................... 301/105.1; 411/427, 265, 270
See application file for complete search history.

(56) References Cited

U.S. PATENT DOCUMENTS

| | | | |
|---|---|---|---|
| 1,384,019 A | | 7/1921 | Johnston |
| 1,398,697 A | * | 11/1921 | Johnson ................. B61D 17/06 |
| | | | 105/411 |
| 1,612,751 A | * | 12/1926 | Stoler ....................... B21K 1/70 |
| | | | 29/894.333 |
| 1,939,769 A | * | 12/1933 | Eksergian ............. F16B 43/025 |
| | | | 411/389 |
| 1,940,617 A | * | 12/1933 | Temple .................... F16B 43/02 |
| | | | 301/35.623 |
| 2,320,032 A | | 5/1943 | Danforth |
| 2,391,279 A | | 12/1945 | Lawson |
| 3,503,584 A | | 3/1970 | Erhart |
| 3,702,628 A | * | 11/1972 | Cosenza ................. F16B 39/36 |
| | | | 411/937.1 |
| 4,236,561 A | | 12/1980 | Monticelli |
| 4,472,095 A | | 9/1984 | Molina |
| 4,589,688 A | | 5/1986 | Johnson |
| 4,610,072 A | | 9/1986 | Muller |
| 4,650,385 A | | 3/1987 | Jackson |
| 4,759,237 A | | 7/1988 | Fauchet |
| 4,805,288 A | | 2/1989 | Cosenza et al. |
| 4,810,010 A | | 3/1989 | Jones |
| 4,890,965 A | | 1/1990 | Dietlein |
| 4,971,495 A | * | 11/1990 | Dolin ...................... B60B 3/165 |
| | | | 411/530 |
| 5,154,560 A | | 10/1992 | Copito |
| 5,160,227 A | | 11/1992 | Tramezzani |
| 5,161,928 A | | 11/1992 | Burdick, Jr. |
| 5,772,377 A | * | 6/1998 | Bydalek .................. F16B 37/14 |
| | | | 411/432 |
| 5,800,108 A | | 9/1998 | Cabahug |
| 6,220,801 B1 | | 4/2001 | Lin |
| 6,808,348 B1 | | 10/2004 | Cosenza |
| 7,252,471 B1 | | 8/2007 | Manyoky |
| 7,338,242 B2 | | 3/2008 | Ellis |
| 8,967,932 B2 | | 3/2015 | Dionne |
| 9,322,426 B2 | | 4/2016 | Thomas |
| 9,331,223 B2 | | 5/2016 | Kim |
| 2007/0243044 A1 | | 10/2007 | Chen |
| 2012/0070246 A1 | | 3/2012 | Peng |
| 2012/0319460 A1 | * | 12/2012 | Straitiff .................... B60B 3/00 |
| | | | 301/105.1 |
| 2013/0101380 A1 | | 4/2013 | Wollmann |
| 2013/0266396 A1 | * | 10/2013 | Dionne ................... F16B 39/24 |
| | | | 411/313 |
| 2015/0016921 A1 | | 1/2015 | Fischbein |
| 2015/0176635 A1 | | 6/2015 | Dionne |
| 2015/0196998 A1 | | 7/2015 | Crawford |
| 2016/0010679 A1 | | 1/2016 | Makino et al. |
| 2018/0031026 A1 | | 2/2018 | Dionne |

FOREIGN PATENT DOCUMENTS

| | | | | |
|---|---|---|---|---|
| CN | 109973507 A | | 7/2019 | |
| DE | 4213913 C1 | * | 11/1993 | ............... B60B 1/06 |
| EP | 0066794 A1 | | 12/1982 | |
| EP | 1241365 A1 | | 9/2002 | |
| EP | 2799729 A1 | | 11/2014 | |
| FR | 2210515 A1 | | 7/1974 | |
| GB | 433699 A | | 8/1935 | |
| GB | 1398697 A | | 6/1975 | |
| GB | 2201216 A | | 8/1988 | |
| JP | S51-093067 U | | 7/1976 | |
| JP | H09-210039 A | | 8/1997 | |
| JP | 2002372024 A | | 12/2002 | |
| JP | 2005313874 A | * | 11/2005 | ............... B60B 3/16 |
| JP | 4087386 B2 | | 5/2008 | |
| JP | 2012017814 A | | 1/2012 | |
| JP | 2018144625 A | * | 9/2018 | ............... B60B 3/16 |
| KR | 1020030042605 A | | 6/2003 | |
| WO | 03069971 A2 | | 8/2003 | |
| WO | 2013138533 A1 | | 9/2013 | |
| WO | 2018050206 A1 | | 3/2018 | |

OTHER PUBLICATIONS

INPI, Preliminary Office Action for corresponding Brazilian Patent Application No. BR112021014828-0, dated Nov. 14, 2023, published May 21, 2024, 7 pages.
TIPO, Office Action for related Taiwanese Patent Application No. 109123714, dated May 3, 2024, 9 pages.
ISA/KR, International Search Report and Written Opinion for corresponding PCT Patent Application No. PCT/US2020/015627, mailed May 29, 2020, 10 pages.
WIPO, International Preliminary Report on Patentability for corresponding PCT Patent Application No. PCT/US2020/015627, issued Jul. 27, 2021, 7 pages.
EPO, Extended European Search Report for corresponding European Patent Application No. 20747584.9, dated Sep. 15, 2022, 7 pages.
INPI, Search Report and Written Opinion for related Brazilian Patent Application No. BR112022000688-8, dated Nov. 14, 2023, 7 pages.
EPO, Extended European Search Report for related European Patent Application No. 20840935.9, mailed Dec. 14, 2023, 7 pages.
USPTO, Non-Final Office Action for related U.S. Appl. No. 17/575,899, dated Jan. 25, 2024, 17 pages.
USPTO, Final Office Action for U.S. Appl. No. 17/575,899, mailed Nov. 20, 2024, 16 pages.

* cited by examiner

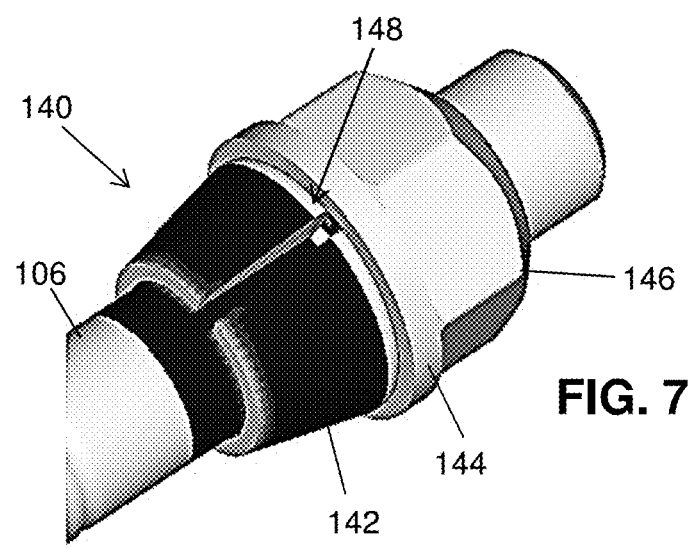
FIG. 7
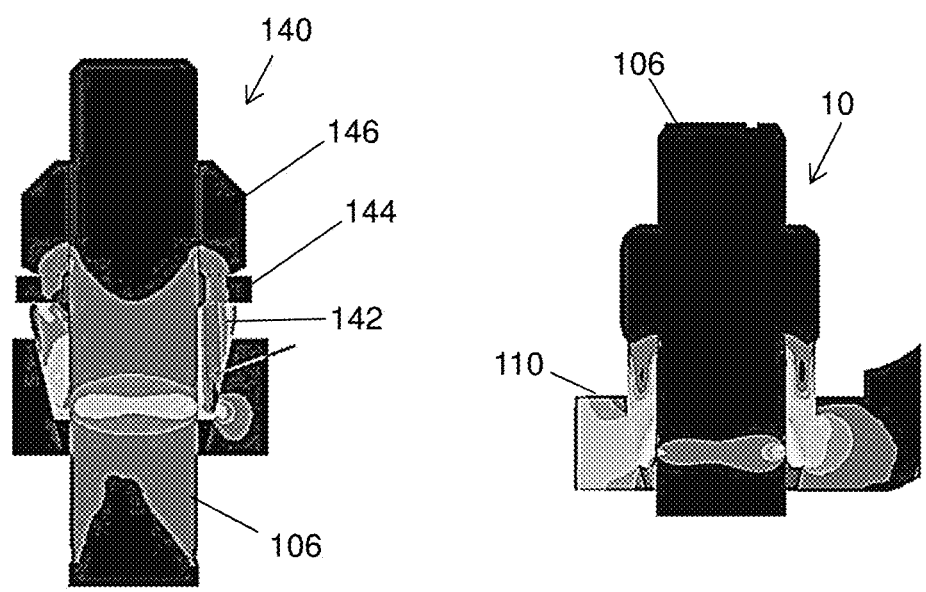
FIG. 8
FIG. 9

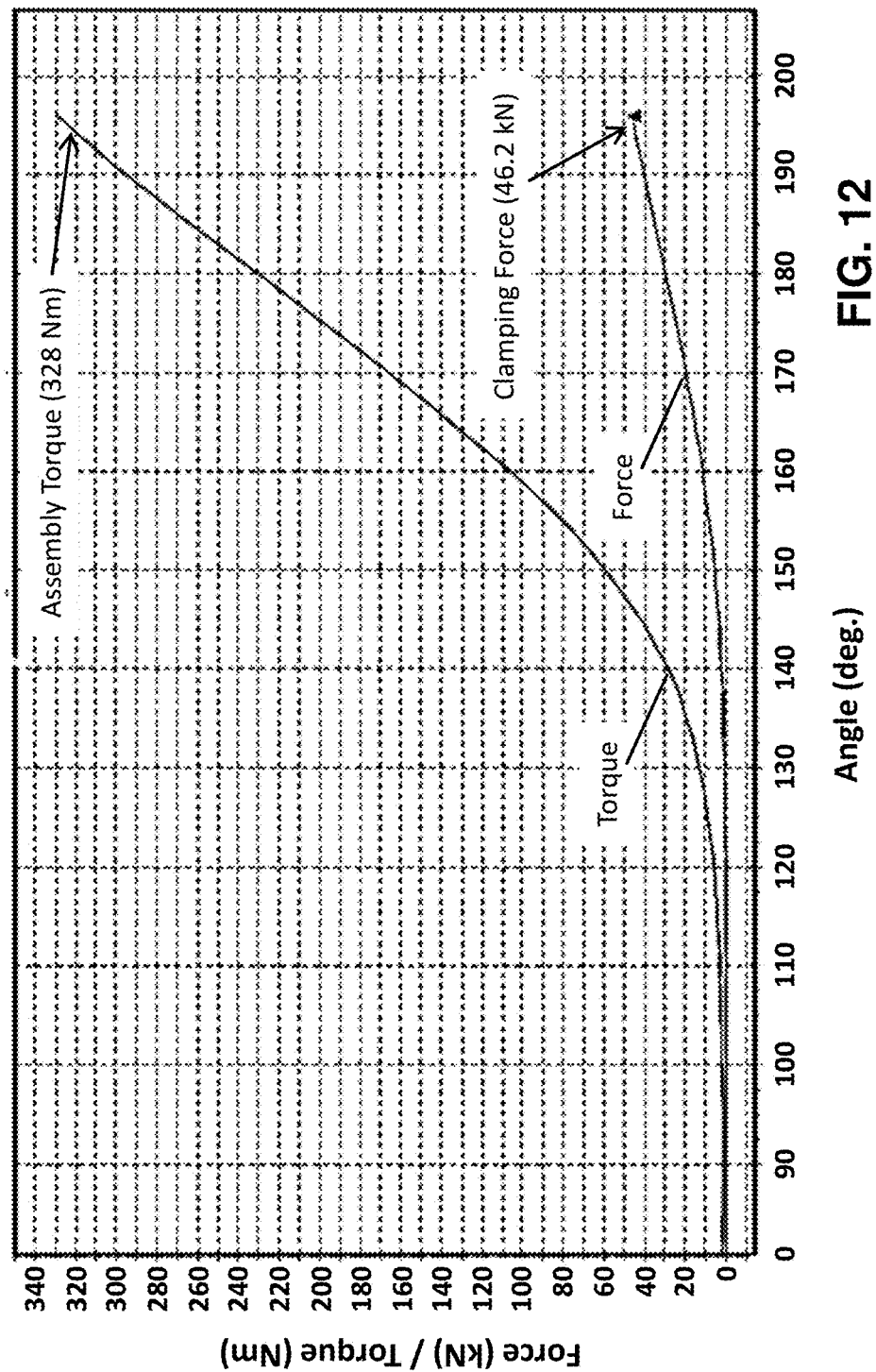

TAPERED FASTENER

CROSS-REFERENCE TO RELATED APPLICATION

This application is a continuation of International Patent Application No. PCT/US2020/015627, titled "IMPROVED TAPERED FASTENER", filed on Jan. 29, 2020, which claims the benefit of priority of U.S. Provisional Patent Application No. 62/798,435, titled "FASTENER AND FASTENER ASSEMBLY HAVING IMPROVED VIBRATIONAL AND TIGHTENING CHARACTERISTICS," filed on Jan. 29, 2019, which are incorporated herein in their entireties by this reference.

TECHNICAL FIELD

This disclosure is related to a fastener and fastener assembly, and, more particularly, towards a fastener and fastener assembly having improved vibrational and tightening characteristics.

BACKGROUND

Fasteners and various fastener assemblies are utilized for securing one or more articles to one another in a variety of settings including commercial, residential, industrial, and the like. These fasteners may be, for example, a nut and bolt assembly in which a threaded portion of the bolt is received within a cooperatively threaded portion of the nut. Nut and bolt assemblies are preferred because of their uniformly accepted use, cost-efficient manufacturing, and acceptable performance in a variety of settings.

Conventional nuts and bolts are susceptible to loosening under vibrational and other loads. Many manners have been introduced in order to combat the vibrational and other forces. For example, some users may provide multiple nuts that are tightened against each other in order to increase the total frictional forces between the nuts and the bolt. Other manners include the use of a split washer having one portion raised relative to the other, i.e. a spring washer, the acts to provide a spring bias to absorb vibrational forces acting on the nut.

Still other manners have been provided for increasing the effectiveness of traditional fasteners such as nuts and bolts. For example, fasteners having multiple-part assemblies have been employed. However, these fastener assemblies have increased cost and may not always have desired effectiveness.

A need therefore exists for a solution that addresses these disadvantages.

SUMMARY

This Summary is provided to introduce a selection of concepts in a simplified form that are further described below in the Detailed Description of Illustrative Embodiments. This summary is not intended to identify key features or essential features of the claimed subject matter, nor is it intended to be used to limit the scope of the claimed subject matter.

In at least one embodiment, a vibration resistant nut is provided for attaching a working surface to a threaded stud, the stud extending through a hole defined through the working surface. The nut includes an annulus for receiving the stud. The annulus includes a cylindrical portion and a tapered terminal end portion for being received in the hole. The tapered terminal end portion extends from the cylindrical portion. The tapered terminal end portion has an outer surface that narrows diametrically from the cylindrical portion. The nut includes a head extending from the cylindrical portion of the annulus opposite the tapered terminal end portion, the head having outer engagement surfaces for engaging a tool for rotation of the nut, the head having a threaded interior for engaging threads of the stud.

The annulus may have a smooth interior wall.

The interior wall may extend within and through the cylindrical portion and tapered terminal end portion.

The interior wall may be free of threads.

The vibration resistant nut may have a staged bore extending therethrough including the interior wall of the annulus and the threaded interior of the head, the staged bore having a first interior clearance diameter defined by the smooth cylindrical interior wall along the annulus, and a second interior clearance diameter along the threaded interior of the head, and wherein the first interior clearance diameter is greater than the second interior clearance diameter.

The interior wall of the annulus may have a diameter that freely permits insertion of the stud and rotation of the nut as the threaded interior of the head engages threads.

The tapered terminal end portion of the annulus may have an essentially frustoconical outer surface.

The outer surface of the tapered terminal end portion of the annulus may have a uniform taper angle.

Tightening of the nut by rotation around the stud may press the tapered terminal end portion into the hole.

The hole may have a conical inner portion, and tightening of the nut by rotation around the stud may increasingly forcibly engage the tapered terminal end portion with the conical inner portion of the hole.

The head may have a sloped forward shoulder extending radially outward relative to the cylindrical portion of the annulus.

The working surface may be a shaft flange mounted on a hub of a wheel hub assembly.

In at least one embodiment, a wheel hub assembly includes: a central hub; a flange mounted on the hub, the flange having multiple holes; multiple studs each affixed to and extending from the hub, each stud having an outer extending portion with external threads; a flange for mounting to the central hub, the flange having multiple holes each for passing therethrough the outer extending portion of a respective stud; and multiple vibration resistant nuts for cooperatively securing the flange to the hub by each engaging a respective stud of the multiple studs passed through a respective hole of the flange. Each of the multiple vibration resistant nuts includes: an annulus for receiving the respective stud, the annulus including a cylindrical portion and a tapered terminal end portion for being received in the respective hole of the flange, the tapered terminal end portion extending from the cylindrical portion, wherein the tapered terminal end portion has an outer surface that narrows diametrically from the cylindrical portion; and a head extending from the cylindrical portion of the annulus opposite the tapered terminal end portion, the head having outer engagement surfaces for engaging a tool for rotation of the nut, the head having a threaded interior for engaging external threads of the respective stud.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings:

FIG. 7 is a perspective view of a three-piece fastener system, distinct from the tapered nut of FIG. 1, mounted on a stud without other portions of a wheel hub assembly for purpose of illustration;

FIG. 8 illustrates an FEA cross-sectional image of a simulated attachment arrangement using the three-piece fastener system of FIG. 7;

FIG. 9 illustrates an FEA cross-sectional image of a simulated attachment arrangement using the improved tapered nut of FIG. 1;

FIG. 12 illustrates results of torque and tension testing of a fastening arrangement using an improved tapered nut as in FIG. 1.

DETAILED DESCRIPTION

Figure 1:
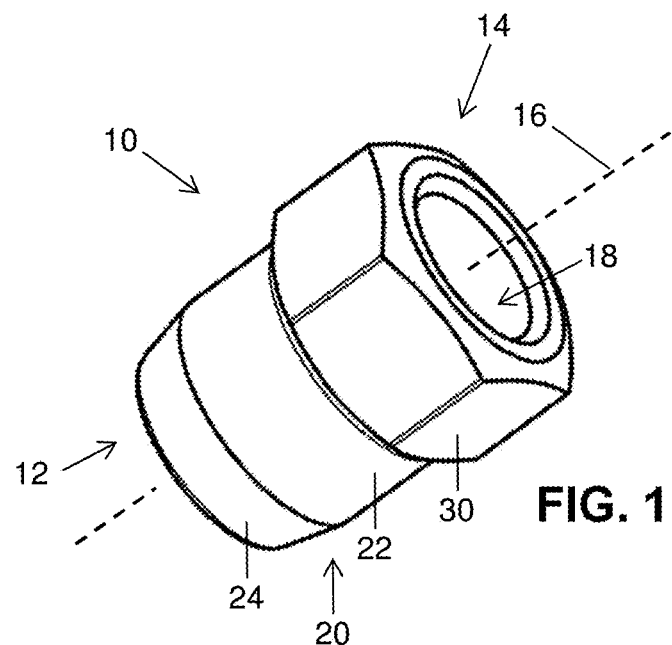
FIG. 1 illustrates a perspective view of an improved tapered nut, according to at least one embodiment, having a head and an annulus.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

FIG. 1 is a perspective view of an improved tapered fastener, referenced generally throughout as the nut 10, according to one or more embodiments disclosed herein. In at least one exemplary use, the nut serves as a one-piece fastener for securing a shaft flange to a hub for mounting a wheel on a vehicle such as an automotive truck as represented by the wheel hub assembly of FIG. 4. The tapered nut 10 generally extends from a longitudinal first end 12 to a longitudinal second end 14 thereof around a longitudinal axis 16. The first end 12, terminating as an uninterrupted circular ring, may be termed also herein as the forward end of the nut 10, and the second end 14 may be termed also as the rearward end of the nut.

The first end 12 is defined by an annulus 20 having a cylindrical portion 22, and a tapered terminal end portion 24 extending from the cylindrical portion. The cylindrical portion 22 and terminal end portion are coaxially aligned. The second end 14 is defined by a head 30 by which the nut can be engaged by a tool and rotated around the longitudinal axis. The head 30 extends from the cylindrical portion 22 of the annulus opposite the terminal end portion 24.

Figure 3A:
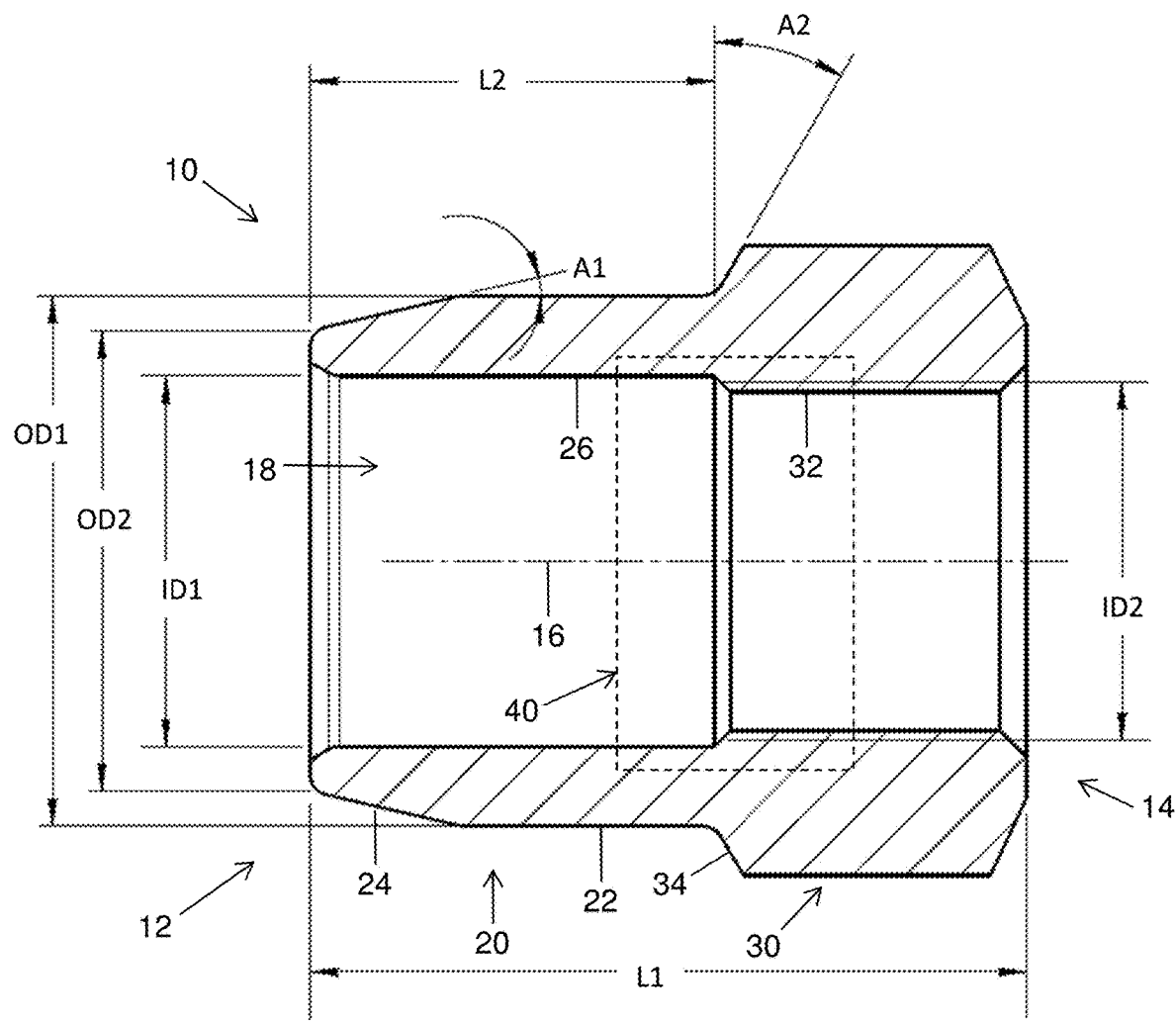
FIG. 3A illustrates a cross-sectional view of the tapered nut taken at the line 3A-3A in FIG. 2.

The full length of the nut 10 is referenced in FIG. 3A as L1, and the length of the annulus 20 is referenced as L2. The outer surface of the tapered terminal end portion 24 narrows diametrically from the outer diameter of the cylindrical portion 22, referenced in FIG. 3A as OD1, to a forward terminal end outer diameter, referenced in FIG. 3A as OD2, at the forward end 12 of the nut 10. The angle of taper of the outer surface of the end portion 24 relative to the longitudinal axis is referenced in FIG. 3A as A1.

Forward and rear edges of the nut 10 and its constituent portions, both external and internal, are beveled, for example to ease entry of a threaded stud into the bore 18 at the forward end 12 (internal beveling) and entry of the forward end 12 (external beveling) into a recessed hole in a working surface.

In the illustrated embodiment, the outer surface of the end portion 24 is essentially frustoconical from the forward end 12 thereof to the frontward end of the cylindrical portion 22, and thus has a uniform taper angle A1 along the entire outer surface thereof, with exception of the external beveling at the forward end 12. In particular, the forward end 12 and end portion 24 have no outer flange or lip extending radially outward.

A staged bore 18, of which the annulus 20 and head 30 provide respective coaxially aligned bore sections, is defined through the nut 10 around the longitudinal axis 16. In the illustrated embodiment, the second or rearward end 14 of the nut 10 is open. In other embodiments, the second or rearward end may be capped or domed. The first or forward end 12 of the nut 10 is open to receive the shank of a threaded stud or bolt.

Figure 2:
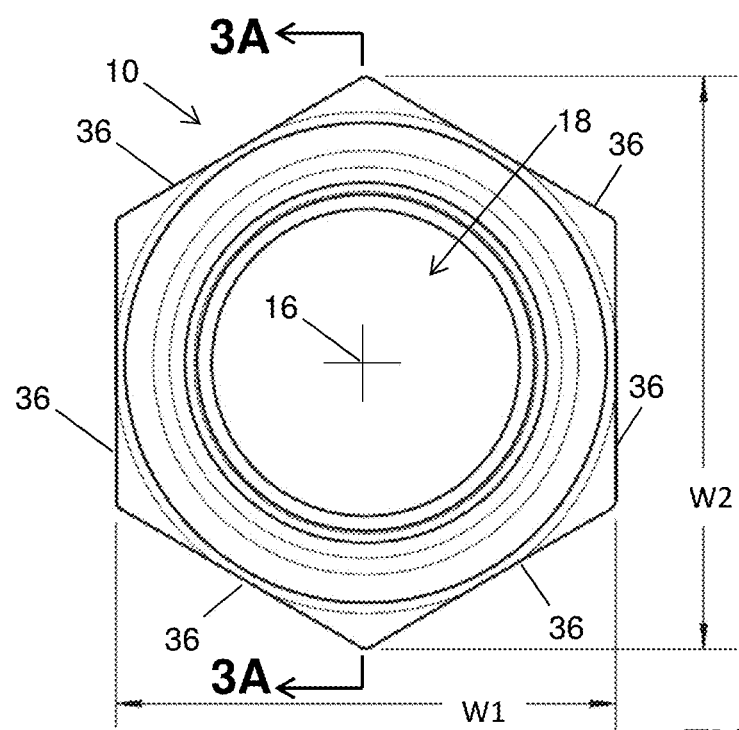
FIG. 2 illustrates a longitudinal view of the annulus end of the tapered nut of FIG. 1.

The head 30 has outer engagement surfaces 36 for engaging a tool for rotation of the nut 10. The head 30 is shown as a hex (six-sided) head in the illustrated embodiment for engaging already available tools. The head may be otherwise configured as having more or less than the six engagement surfaces 36 illustrated as planar sides (FIG. 2), and may have other shapes other than that illustrated in other embodiments within the scope of these descriptions. The head 30 is generally wider (referring to lateral or radially extending dimensions perpendicular to the longitudinal axis 16) than the annulus 20.

The head 30 has a sloped forward shoulder 34 extending laterally or radially outward relative to the cylindrical portion 22 of the annulus. The slope angle of the forward shoulder 34 relative to a plane perpendicular to the longitudinal axis is referenced in FIG. 3A as A2. The width of the head 30 from one planar side 36 to the opposite planar side 36 is referenced in FIG. 2 as W1. The width of the head 30 from corner to opposite corner is referenced in FIG. 2 as W2. Whether comparing W1 or W2 to the outer diameter (OD1) of the cylindrical portion 22 of the annulus 20, no portion of the annulus 20 extends radially outward further than the any portion of the head 30.

The head 30 is fixed to the cylindrical portion 22 of the annulus 20 distal or opposite the tapered terminal end portion 24. The tapered nut 10 may be of a one-piece unitary construction, as illustrated, formed of contiguous durable material, such as, according to at least one non-limiting example, cold rolled steel, and may have a black oxide or other finish.

In the illustrated embodiment, the annulus 29 has a smooth interior wall 26, defining a first or forward section of the staged bore 18, and extending within and through the cylindrical portion 22 and end portion 24. The interior wall 26 in the illustrated embodiment is free of threads. The head 30 has a threaded interior 32, defining a second or rearward section of the stage bore 18. The inner diameter of the interior wall 26 is referenced in FIG. 3A as ID1. The interior diameters or dimensions of the threaded interior 32, referenced in FIG. 3A together as ID2, may vary among embodiments according to thread specification to correspond and engage the threads of a stud or bolt with which the nut 10 is to be paired. Thus, ID2 in FIG. 3A represents a major diameter (ID2M) and a minor diameter (ID2m), which are separately referenced for clarity in the enlarged view of FIG. 3B, according to any selected thread specification.

Figure 3B:
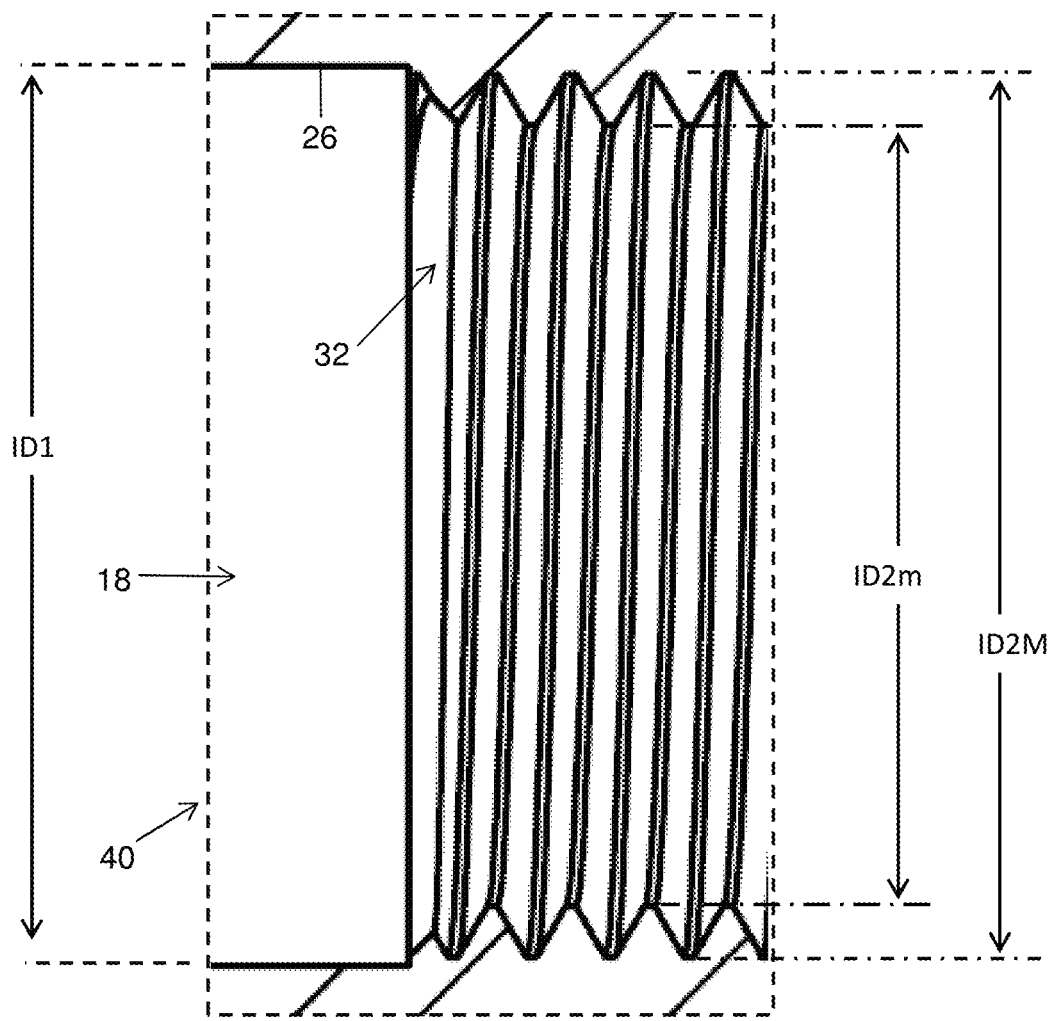
FIG. 3B illustrates a cross-sectional view of an enlarged portion of FIG. 3A for illustration of a threaded portion of the nut.

FIG. 3B shows an enlarged cross-sectional view of an interior portion 40 of the nut 10 as outlined in FIG. 3A. The staged bore 18 has an effective greater first interior clearance diameter of ID1 along the annulus defined by the interior wall 26 (both along the cylindrical portion 22 and end portion 24), than its effective second interior clearance diameter (ID2m) along the threaded interior 32 of the head.

Figure 4:
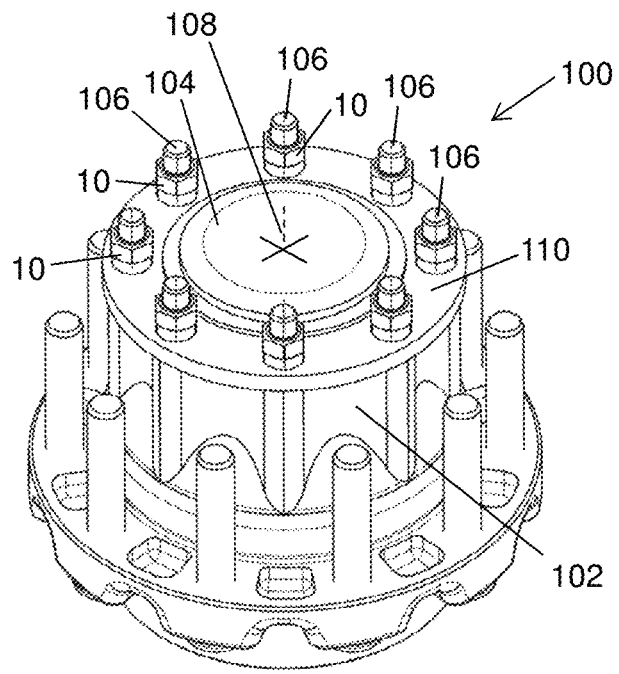
FIG. 4 illustrates a perspective view of a wheel hub assembly having multiple tapered nuts according to the embodiment of FIG. 1.
Figure 5:
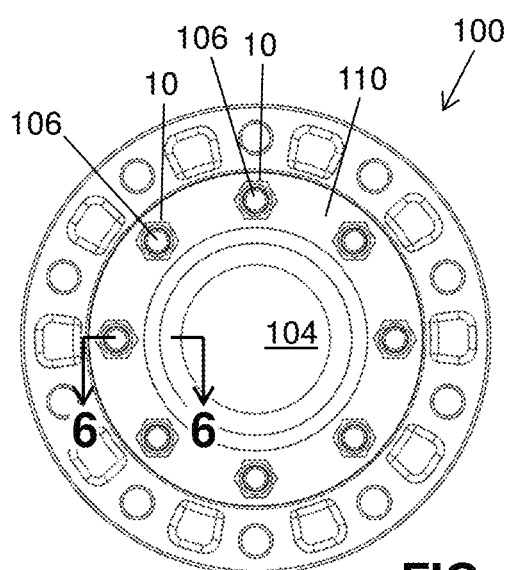
FIG. 5 illustrates a longitudinal view of the wheel hub assembly of FIG. 4.

In the non-limiting example of use shown in FIG. 4, the wheel hub assembly 100 has a central hub 102 upon which a shaft flange 104 is mounted by use of multiple studs 106 and tapered nuts 10. As shown, each stud 106 is affixed to and extends from the hub 102 and through the shaft flange 104. The outer extending portion 112 (FIG. 6) of the stud 106 is passed through a respective hole 114 upon mounting the flange 104 to the hub 102. Each outer extending portion 112 has external threads that engage the threaded interior 32 of the head 30 of the nut 10. By advantage of the staged bore 18 having an effective greater interior clearance diameter of ID1 along the annulus defined by the smooth cylindrical interior wall 26 (both along the cylindrical portion 22 and end portion 24), than its effective interior clearance diameter (ID2m) along the threaded interior 32 of the head, the annulus freely permits insertion of the stud 106 and rotation of the nut 10 thereon as the threaded interior 32 (FIG. 3B) of the head 30 engages the threaded portion 112 of the stud for tightening and loosening when mounting and dismounting the shaft flange 104 to and from the hub.

Each stud 106 extends from the hub 102 and is received by a respective hole 114 defined through the radially outer portion 110 of the shaft flange 104, the holes 114 arranged in a circular pattern radially equidistant from the rotational central axis 108 of the wheel hub assembly 110. Each hole 114 has at least an inner portion that is conical, narrowing toward the hub and widening toward the outer surface of the shaft flange 104. As the nut 10 engages the stud 106 and is tightened, the annulus of the nut is pressed toward the hole 114. In particular, as the nut 10 is tightened, the tapered terminal end portion 24 increasingly forcibly engages the conical inner portion of the hole 114, and upon tightening of all nuts 30 upon their respective studs 106, concentric alignment of the shaft flange 104 and central hub 102 is assured in the wheel hub assembly 100 (FIG. 4). Frictional engagement of the tapered terminal end portion 24 of the nut 10 with the conical inner portion of the hole 114 provides a resistive force against loosening when subjected to vibrational forces as when a vehicle is driven on a roadway. Thus each nut 10 cooperatively with the other nuts 10 secure the shaft flange 104 to the central hub 102 by engaging a respective stud 106, particularly the threaded portion 112 thereof.

FIG. 4 expressly illustrates a wheel hub assembly 100 as a non-limiting example of use of the tapered nut of FIG. 1, but is intended to more generally represent as well other fastening arrangements in which the annulus of the improved nut is received at least partially within a conical or narrowing hole of a working surface, as represented by the conical hole 114 defined in the outer surface of the shaft flange 104. Tightening of the nut 10 on the threaded stud 106 causes may cause some degree deformation of the conical portion of the inner surface of the hole and nut, particularly the tapered terminal end portion 24 of the annulus 20, and particularly upon first use and engagement of each nut with a respective particular hole.

Figure 6:
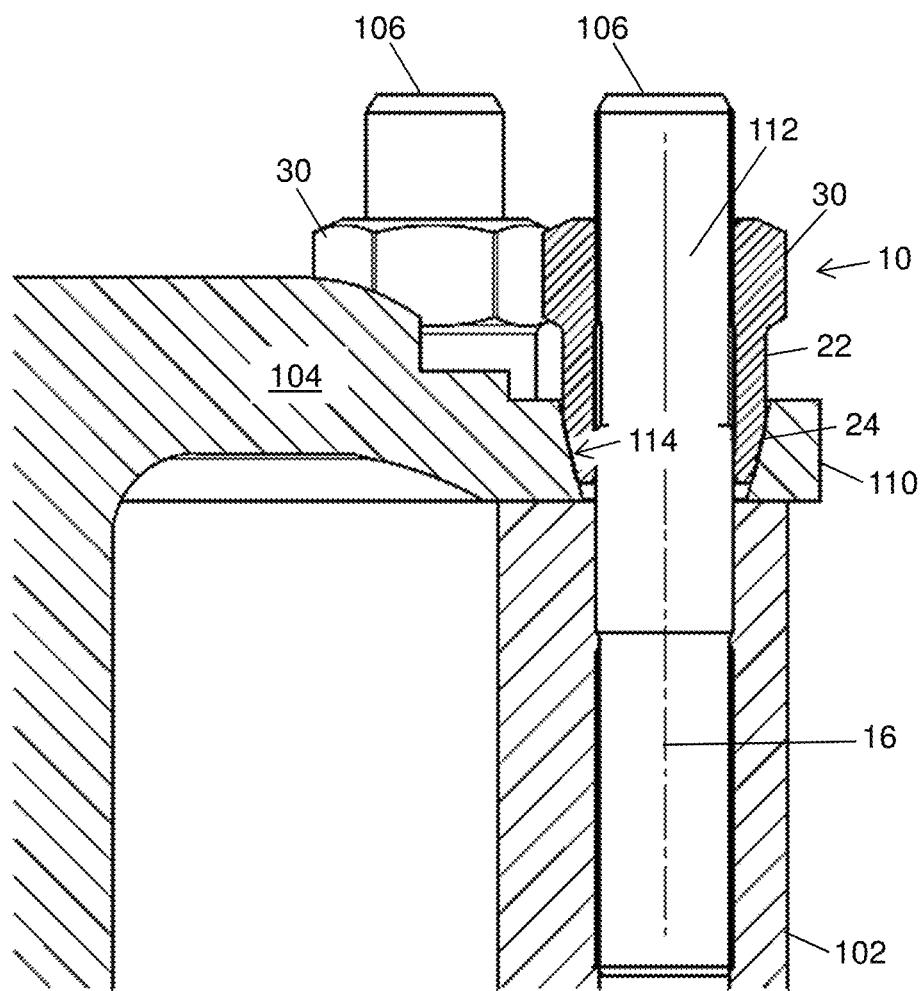
FIG. 6 illustrates an enlarged cross-sectional view of a portion of the wheel hub assembly of FIG. 4 taken along the line 6-6 in FIG. 5.

A recessed hole 114 as represented in FIG. 6 may be reamed, drilled, tapped, punched or milled to manufacturer or product specific dimensions, or industry-standardized dimensions. Depending on the construction process of the hole, the circumference of the entrance of the hole may have consistency issues or deformation features thereabout. In some embodiments, the circumferential entrance of the hole may provide a frictional element. The annulus may also include frictional features on an inwardly-facing or outwardly-facing side. In some embodiments, the entrance of the hole may have a diameter that is greater than that of a deeper portion of the hole, defining a conical inner portion of the hole as represented in FIG. 6.

At least in some uses, the improved tapered nut 10 is advantageous in use over the use of a conical bushing, sometimes referred to as a dowel, represented in perspective view in FIG. 7. The improved tapered nut 10, for example, has a one-piece unitary construction, whereas the fastener system 140 has three pieces, which must be stocked and handled with each assembly and disassembly of a fastening arrangement with their use.

In using the illustrated three-piece fastener system 140, for example in a wheel hub assembly or other fastening arrangement with a stud extending from a hole, a respective conical bushing 142 is to be received in use in each hole of the outer portion 110 of the shaft flange (FIG. 7). The three-piece fastener system 140 of FIG. 7, shown mounted on the stud 106 but without other portions of the wheel hub assembly for illustration of the three components thereof, serves a similar role as the improved tapered nut 10. In use, the split conical bushing 142 (FIGS. 7-8) is pressed into the hole of the shaft flange by a washer 144 and conventional nut 146.

In some instances, after installation, use, and exposure to road condition elements such as salt water and general outdoor exposure, the split conical bushing 142 may lock to the stud 106 even upon removal of the nut 146, such that disassembly of the wheel hub assembly is difficult. As a conventional nut 146 is turned relative to the stud 106, the conical bushing 142, which lacks internal threads and is separated from the nut by the washer 144, tends not to rotate and thus can remain engaged with the stud 106 and working surface, with reference for example to the shaft flange 104 (FIG. 7). Thus, the conical bushing 142 can get stuck between the stud 106 and an axle shaft flange, within the conical hole, causing undesirable and time-inefficient bottle-necking of manufacturing and maintenance practices. Multiple tools are typically needed to remove a stuck conical bushing 142, and mechanics ultimately may use impact tools such as a hammer, such that injury is possible, especially if the operation is rushed.

In using the improved tapered nut 10, the annulus 20 and tapered terminal end portion 24 thereof are rotated relative to the stud 106 and freed therefrom by rotation of the head 30, permitting ready and convenient disassembly of the wheel hub assembly 100 in shortened time with a single tool, such as a wrench.

Further, where the bushing used is a split conical bushing, having a slot 148 that permits deformation of the bushing, the slot permits salt water or other corrosive elements to enter the contact areas between the bushing and shaft flange, and between the bushing and stud. Thus rusting can occur, which makes the disassembly of a fastening arrangement difficult and inefficient.

Finite element analysis (FEA) simulations indicate better force load distribution from nut to workpiece when a tapered nut 10 is used in lieu of a three-piece fastener system 140 having a split conical bushing 142, washer 144 and conventional nut 146. FIGS. 8 and 9 provide FEA derived images for comparison in internal forces in similar fastening arrangements in which a three-piece fastener system 140 (FIG. 8) and a tapered nut 10 (FIG. 9) are respectively used. By improved force distribution, material fatigue and failure are expected to be reduced by use of a tapered nut instead of a three-piece fastener system.

The clamping force needed in a joint is prescribed in many fastening arrangements, and is used as a parameter in the design or selection of a compliant fastener system. Clamping force is applied along the longitudinal axis when a nut is turned on a threaded stud. Thus, torque applied to tighten the nut results in increasing linear force along the longitudinal axis expressed as tension in the stud and clamping force upon a working surface from which the stud extends. In automotive uses, a suggested or required torque may be prescribed for each particular assembly joint or connection, and that prescribed torque is based upon the presumption that a particular type of fastener system is being used. Each type of fastener system has a respective particular torque and tension relationship.

Figure 10:
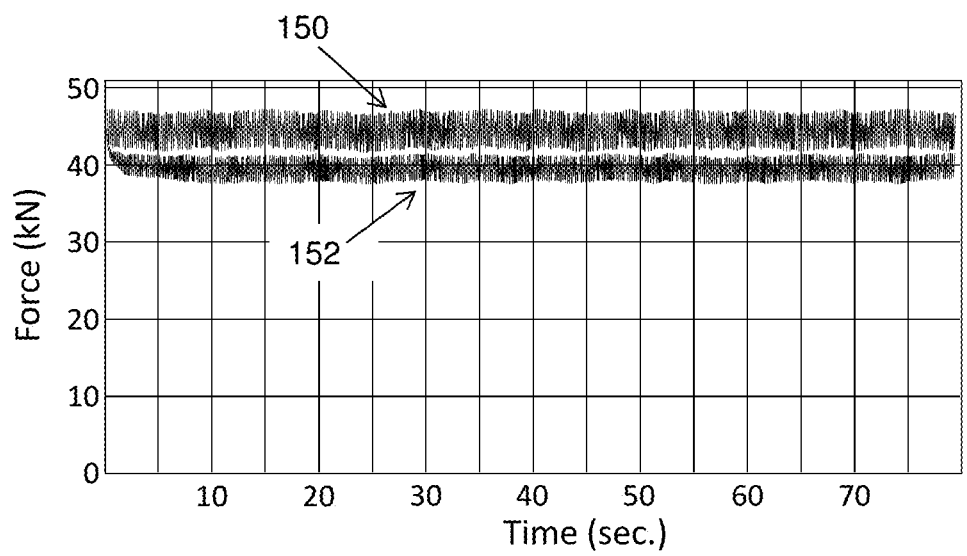
FIG. 10 illustrates results of vibrational testing of respective attachment arrangements using the improved tapered nut of FIG. 1 and the three-piece fastener system of FIG. 7.

For comparison of the ability of a joint fastened by the improved tapered nut 10 (FIG. 1) to hold its preloaded clamping force or tension when subject to vibration, to that of a conventional three-piece fastener system 140 (FIG. 8), a Junker vibration test was performed on each. In each test, the respective fastener was brought to a prescribed preload of 45 kN, and shear loading was applied by transverse vibration at 12.5 Hz with an amplitude of 10% of bolt diameter. As represented in FIG. 10, in which the upper plot shows 150 test results representative of the tapered nut 10, and the lower plot 152 shows the test results representative the three-piece fastener system 140, each fastening system exhibited an initial reduction in clamping force and then settled to a steady state range during the vibrational testing. In particular, the clamping force of the tapered nut fastener (upper plot 150) reduced from its preload by approximately 5%, whereas the three-piece fastener system (lower plot 152) reduced from the preload by approximately 13%. Thus, the advantage of the tapered nut over a conventional three-piece fastener system, as better able to hold a prescribed clamping force when in use, for example when used in a wheel hub assembly and subjected to vibrational forces as when a vehicle is driven on a roadway, is evidenced by the test results shown in FIG. 10.

Figure 11:
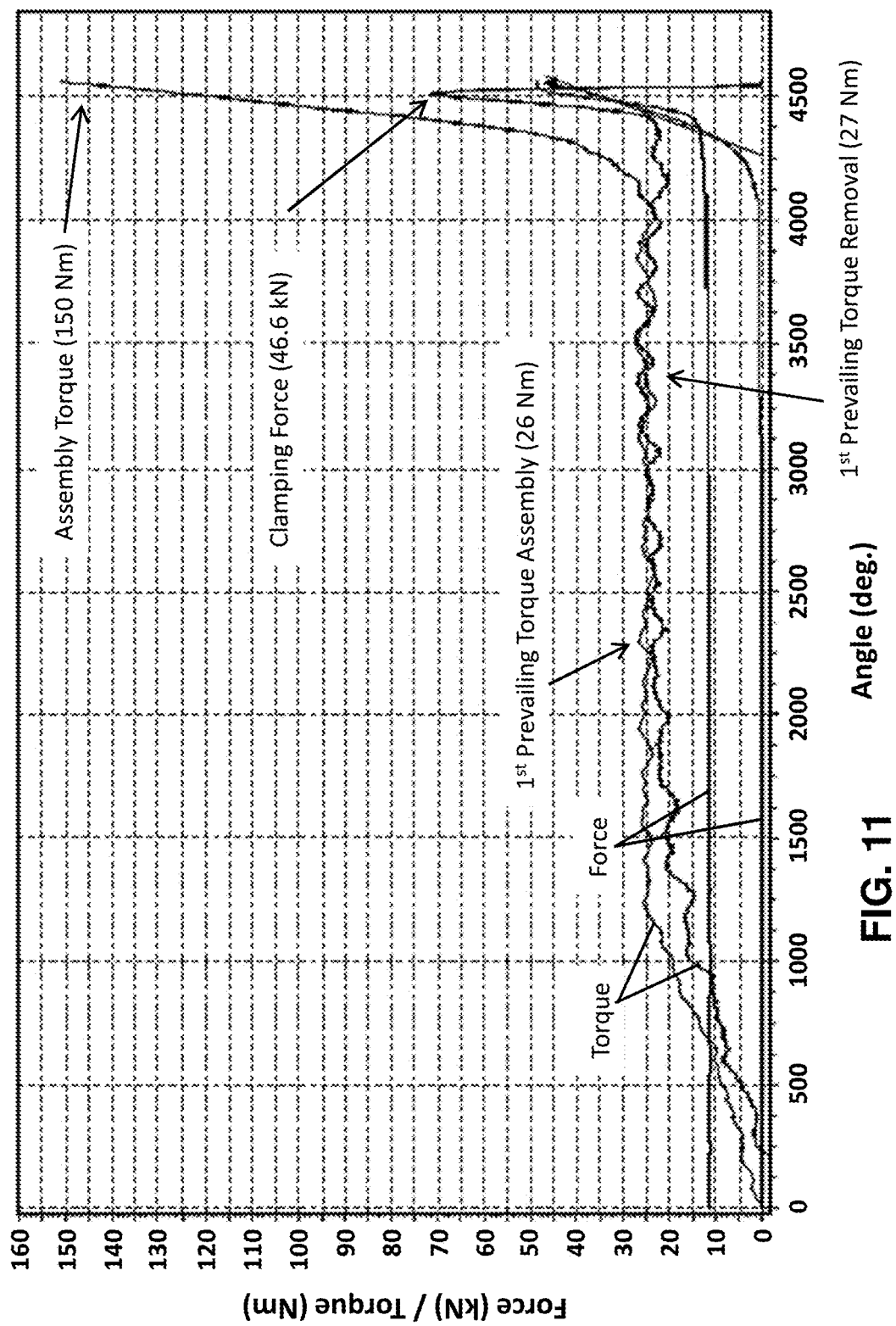
FIG. 11 illustrates results of torque and tension testing of a fastening arrangement using a three-piece fastener system as in FIG. 7.

FIGS. 11 and 12 provide additional empirical data for comparing a three-piece fastener system 140 such as in FIG. 7, to a tapered nut 10 as in FIG. 1. FIG. 11 shows a measured torque and tension relationship of a fastening arrangement using a three-piece fastener system; and FIG. 12 shows that of a fastening arrangement using a tapered nut. As each type of fastener system has a respective particular torque and tension relationship, and the preloaded clamping force needed in a joint is often prescribed, particularly for example in the automotive industry, the torque and tension relationship for each particular type of fastening system according to size and other specific geometries may need to be investigated to assure compliance in final use. Thus, any comparison in view of FIGS. 11 and 12 should be taken as qualitative.

FIG. 11 illustrates results of torque and tension testing of a fastening arrangement using a three-piece fastener system 140 as in FIG. 7. Both torque applied to the nut and consequent clamping force are plotted against progressing rotation angle of the nut (left to right) as the conical bushing 142 (FIG. 7) is driven into the working surface. The effective torque and tension relationship of the fastening arrangement is exhibited in the right of the graph corresponding to the bushing seating in the working surface.

FIG. 12 illustrates results of torque and tension testing of a fastening arrangement using an improved tapered nut 10 as in FIG. 1. As in FIG. 11, both torque applied to the nut and consequent clamping force are plotted against progressing rotation angle of the nut (left to right). The data shown in FIG. 12 was taken after multiple installations of a particular nut and workpiece. First installations (not shown) typically exhibit a bulge in measured torque as the nut and workpiece conform by slight deformations prior to reaching the target assembly torque and clamping force. As can be seen by comparison of FIGS. 11 and 12, the torque required to reach the target clamping force of approximately 46 kN is increased in FIG. 12, in part at least due to resistance between the rotating tapered nut and workpiece, whereas the tapered bushing does not turn against the workpiece in using the three-piece fastener system 140.

A fastening arrangement using the improved tapered nut 10 exhibits a simpler and smoother torque and tension relationship (FIG. 12) for improved predictable performance with regard to reaching a target clamping force by applying a prescribed torque.

Ultimately, when compared to a three-piece fastening system 140, use of the improved tapered nut 10 is expected to provide: faster and more predictable maintenance times to improve time estimate accuracy for scheduling and customer satisfaction purposes; lower upfront and subsequent maintenance costs; better clamping force consistency; superior vibration resistance; protects studs against corrosion; and provide a higher load capacity.

Particular dimensions provided in Table 1 are of particular advantage for use in assembling a wheel hub assembly as represented in FIG. 4. The particular dimensions provide for assuring a wheel hub assembly is stable and secure against vibrational loosening. The particular dimensions in Table 1 are to be understood as non-limiting examples unless otherwise expressly stated or claimed. When the dimensions in Table 1 are implemented together, a particularly advantageous embodiment of the nut 10 results. However, each dimension in Table 1 may impart its own respective advantage, such that an advantageous embodiment of the nut 10 may implement any number of the below dimensions, or any subset thereof, with or without implementing them all.

TABLE 1

| | |
|---|---|
| OD1 | 23 ± 0.15 millimeters (mm) |
| OD2 | 20 + 0.3 (−0) (mm) |
| ID1 | 16.1 + 0.15 (−0) (mm) |
| ID2 | (ID2M, ID2m) Threaded for 5/8 inch, 18 UNF − 2B |
| L1 | 31 ± 0.3 (mm) |
| L2 | 17.5 ± 0.5 (mm) |
| A1 | 13 ± 1 (degrees) |
| A2 | 30 ± 15 (degrees) |
| W1 | 23.8 (+0) − 0.39 (mm) |
| W2 | 26.3 MIN (mm) |

While the embodiments have been described in connection with the preferred embodiments of the various Figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A vibration resistant nut for attaching a working surface to a threaded stud, the stud extending through a hole defined through the working surface, the nut comprising:

an annulus for receiving the stud and having a first longitudinal length, the annulus including a cylindrical portion and a tapered terminal end portion for being received in the hole, the tapered terminal end portion extending from the cylindrical portion, wherein the cylindrical portion has an outer surface that has a consistent outer diameter around a circumference and an entire longitudinal length of the cylindrical portion, wherein the tapered terminal end portion has an outer surface that narrows diametrically from the cylindrical portion, and wherein the annulus has a smooth cylindrical interior wall through both the tapered terminal end portion and the cylindrical portion and the interior wall of the cylindrical portion is free of threads; and a head extending from the cylindrical portion of the annulus opposite the tapered terminal end portion, the head being of a second longitudinal length and having outer engagement surfaces for engaging a tool for rotation of the nut, the head having a threaded interior for engaging threads of the stud, wherein a diameter of the head is greater than a diameter of the annulus such that no portion of the annulus extends radially outward further than any portion of the head, wherein the head further comprises a sloped forward shoulder affixed along opposed edges thereof to and disposed between the outer engagement surfaces and the cylindrical portion such that the shoulder extends radially outward relative to the cylindrical portion and radially inward relative to the outer engagement surfaces and narrows diametrically from the engagement surfaces to the cylindrical portion, and wherein the first longitudinal length is greater than the second longitudinal length.

2. The vibration resistant nut of claim 1, wherein the entire length of the cylindrical portion is greater than a length of the tapered terminal end portion.

3. The vibration resistant nut of claim 1, wherein the nut has a staged bore extending therethrough defined by the interior wall of the annulus and the threaded interior of the head, and wherein the staged bore has a first interior clearance diameter defined by the smooth cylindrical interior wall along the annulus, and a second interior clearance diameter along the threaded interior of the head, and wherein the first interior clearance diameter is greater than the second interior clearance diameter.

4. The vibration resistant nut of claim 1, wherein the interior wall of the annulus has a diameter that freely permits insertion of the stud and rotation of the nut as the threaded interior of the head engages threads.

5. The vibration resistant nut of claim 1, wherein the tapered terminal end portion of the annulus has an essentially frustoconical outer surface.

6. The vibration resistant nut of claim 5, wherein the outer surface of the tapered terminal end portion of the annulus has a uniform taper angle.

7. The vibration resistant nut of claim 1, wherein tightening of the nut by rotation around the stud presses the tapered terminal end portion into the hole.

8. The vibration resistant nut of claim 1, wherein the hole defined through the working surface has a conical inner portion, and wherein tightening of the nut by rotation around the stud increasingly forcibly engages the tapered terminal end portion with the conical inner portion of the hole.

9. The vibration resistant nut of claim 1, wherein the working surface comprises a flange mounted on a hub of a wheel hub assembly.

10. A wheel hub assembly comprising:

a central hub;

a flange mounted on the hub, the flange having multiple holes;

multiple studs each affixed to and extending from the hub, each stud having an outer extending portion with external threads;

a flange for mounting to the central hub, the flange having multiple holes each for passing therethrough the outer extending portion of a respective stud; and multiple vibration resistant nuts for cooperatively securing the flange to the hub by each engaging a respective stud of the multiple studs passed through a respective hole of the flange, each of the multiple vibration resistant nuts comprising:

an annulus for receiving the respective stud and having a first longitudinal length, the annulus including a cylindrical portion and a tapered terminal end portion for being received in the respective hole of the flange, the tapered terminal end portion extending from the cylindrical portion, wherein the cylindrical portion has an outer surface that has a consistent outer diameter around a circumference and an entire longitudinal length of the cylindrical portion, wherein the tapered terminal end portion has an outer surface that narrows diametrically from the cylindrical portion, and wherein the annulus has a smooth cylindrical interior wall through both the tapered terminal end portion and the cylindrical portion and the interior wall of the cylindrical portion is free of threads; and a head extending from the cylindrical portion of the annulus opposite the tapered terminal end portion, the head having outer engagement surfaces for engaging a tool for rotation of the nut, the head having a second length and a threaded interior for engaging external threads of the respective stud, wherein a diameter of the head is greater than a diameter of the annulus such that no portion of the annulus extends radially outward further than any portion of the head, wherein the head further comprises a sloped forward shoulder affixed along opposed edges thereof to and disposed between the outer engagement surfaces and the cylindrical portion such that the shoulder extends radially outward relative to the cylindrical portion and radially inward relative to the outer engagement surfaces and narrows diametrically from the engagement surfaces to the cylindrical portion, and wherein the first length is greater than the second length.

11. The wheel hub assembly of claim 10, wherein a length of the cylindrical portion is greater than a length of the tapered terminal end portion.

12. The wheel hub assembly of claim 10, wherein the nut has a staged bore extending therethrough including the interior wall of the annulus and the threaded interior of the head, and wherein the staged bore has a first interior clearance diameter defined by the smooth cylindrical interior wall along the annulus, and a second interior clearance diameter along the threaded interior of the head, and wherein the first interior clearance diameter is greater than the second interior clearance diameter.

13. The wheel hub assembly of claim 10, wherein the interior wall of the annulus has a diameter that freely permits insertion of the stud and rotation of the nut as the threaded interior of the head engages threads.

14. The wheel hub assembly of claim 10, wherein the tapered terminal end portion of the annulus has an essentially frustoconical outer surface.

15. The wheel hub assembly of claim 10, wherein each respective hole of the flange has a conical inner portion, and wherein tightening of the nut by rotation around the respective stud increasingly forcibly engages the tapered terminal end portion with the conical inner portion of the respective hole.

* * * * *